INVENTORS
JOHN W. HICKS, JR.
ELIAS SNITZER
BY HAROLD OSTERBERG
ATTORNEYS

INVENTORS
JOHN W. HICKS, JR.
ELIAS SNITZER
BY HAROLD OSTERBERG
ATTORNEYS

INVENTORS
JOHN W. HICKS, JR.
ELIAS SNITZER
BY HAROLD OSTERBERG
ATTORNEYS

United States Patent Office 3,157,726
Patented Nov. 17, 1964

3,157,726
OPTICAL ENERGY TRANSMITTING DEVICES AND
METHOD OF MAKING SAME
John W. Hicks, Jr., Fiskdale, and Elias Snitzer and Harold
Osterberg, Sturbridge, Mass., assignors to American
Optical Company, Southbridge, Mass., a voluntary
association of Massachusetts
Filed Mar. 1, 1960, Ser. No. 12,128
6 Claims. (Cl. 88—1)

This invention relates to optical energy transmitting devices and to a method of making same. More particularly, the invention relates to thin elongated optical devices of novel construction and arrangement for enabling the efficient separate or simultaneous transmission, as desired, of optical energy in the form of different independent but readily distinguishable electromagnet modes of energy propagation from one end thereof to the other in accordance with the character of light being received from suitable light source means disposed adjacent one end thereof for transmission to suitable receiving and detecting means disposed adjacent the opposite end thereof. The invention also includes the method of making same.

More specifically, the invention is directed to optical energy transmission devices including relatively thin elongated filament-like elements of such predetermined and carefully controlled optical and physical characteristics as to function in the optical region of the electromagnetic spectrum and transmit in a predetermined manner optical energy, including not only visible light but radiation in the ultra-violet and infra-red regions as well, therethrough as separate well-defined and readily detectable and distinguishable electromagnetic modes of energy propagation and distribution; with the result that same may be used advantageously in various ways, such as an optical energy transmission means for the separate and independent or simultaneous transmission of data, information, signals and the like. For example, such devices may be used advantageously as single or multi-channel optical wave guide means for the transmission from one location to another of one or a plurality of different separately distinguishable electromagnetic modes of propagation such as might be desirable in the rapid handling in data or information in high-speed electronic computers, recorders and the like, and in the control and guidance systems of missiles and the like. Also, the improved devices might be used as miniature means for the excitation of one or another preselected mode for use in the study of the energy transmission and distribution, mode propagation, and intensity radiation patterns of full size microwave relay systems and the like.

It is, accordingly, an object of the invention to provide optical energy transmission devices capable of separately and also simultaneously but independently transmitting, as desired, one or a plurality of predetermined distinct electromagnetic modes of energy propagation and distribution of optical energy from one location to another in spaced relation thereto. It is also an object of the invention to provide a method of making and using same.

It is also an object of the invention to provide optical devices of the character described which will transmit selected predetermined electromagnetic modes of energy propagation and distribution while simultaneously preventing the transmission of light energy of different modes from passing therethrough.

It is also an object of the present invention to provide optical devices of the character described and a method for providing predetermined energy distribution and intensity patterns adjacent the exit ends of the devices and means for receiving and measuring, and recording, if desired, said intensity and pattern thereof.

Other objects and advantages of the invention will become apparent from the detailed description which follows when taken in conjunction with the accompanying drawings in which.

Figure 1:
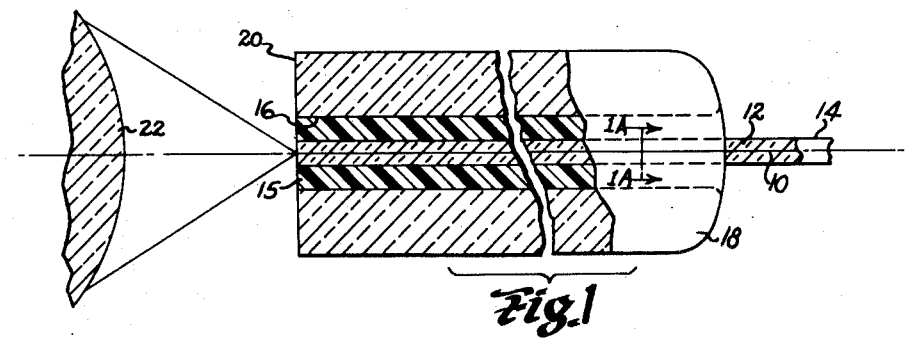
FIG. 1 is a view of an end portion of an optical energy transmission device embodying the present invention, parts thereof being broken away in longitudinal section to better show details thereof.

Fiber optical image transfer devices formed of a relatively large number of small individual light-transmitting fibers bundled together in side-by-side relation so that each fiber thereof will separately transmit light of adjacent unit areas of an optical image at one end of the bundle to the other end thereof for forming a second image have been known and used for some time. In order to have such devices function efficiently and without diffusion of the light from one fiber to an adjacent fiber, it has been found desirable to form these fibers of transparent material of a relatively high refractive index and to provide each of the fibers thereof with a relatively thin encircling coating of a transparent material of a lower refractive index to function as optical insulation therebetween; with the result that adjacent fibers, in effect, functioned independently of one another.

In such devices of earlier construction, the light passing through each of the coated fibers thereof complied with the laws of geometric optics while being totally internally reflected a great many times before reaching the exit end thereof and these reflections took place at the interfaces between the high index core of the fiber and its low index coating. Furthermore, since the degree of resolution which can be obtained by such a bundle of fibers functioning as an image transfer device is directly related to the cross-sectional size of the individual fibers thereof, it has been desirable at times to provide coated fibers of very small sizes; and devices having as many as 250,000 per square inch have already been produced.

It has now been found, however, that individual elongated light-conducting elements of very much smaller cross-sectional size can be produced and when same are properly controlled as to the physical and optical characteristics thereof and with due consideration as to the character of the light to be transmitted thereby, these very fine elements can be made to function, not in accordance with the generally accepted laws of geometric optics but more in keeping with the principles of physical optics in the optical region of the electromagnetic spectrum, as optical wave guides, providing at such times one or more modes of electromagnetic energy propagation and distribution in the light being transmitted from end-to-end thereof. Not only can each individual exceedingly small elongated element be made to transmit one, and in some cases several, predetermined distinct and readily recognizable or distinguishable modes of energy propagation separately or simultaneously but also each can be predetermined so as to have a desired cutoff point, with the result that other higher order propagation modes which might not be desired for one reason or another will be filtered out.

More specifically, it has been found that when each very small elongated element of light-transmitting material is made of such a very small cross-sectional size as to approximate a selected wave length of light and has certain optical and physical properties thereof suitably controlled in accordance with the wave length of the light to be transmitted thereby, said element will function as highly efficient optical wave guide and simultaneously transmit one or a number of distinct and separately predetermined modes of energy propagation while rejecting others; with the result that separate modes can be, in effect, utilized as channels for the independent but simultaneous transmission of different information or signals therethrough. Also, the energy distribution and radiation patterns provided by certain of these optical wave guides are such as to be used in the analysis of the radiation patterns of microwave antennas and the like.

Such an exceedingly small elongated light-conducting element of relatively high refractive index material (which may have a mean cross-sectional size ranging from a small fraction of a wave length to as much as 30 microns or thereabouts) is indicated by the numeral 10 in FIG. 1 and this thin elongated element is surrounded by a coating 12 of transparent material of a lower refractive index. Hereinafter in places throughout the specification and claims, this light-conducting element may also be termed a core and the coating referred to as a cladding, and both together called a filament or coated filament. The cladding 12, in most cases, should be at least two or three microns in thickness and, for most purposes, may be much thicker, and even as large as 100 times the diameter of the core, if desired.

In any such individual light-conducting filament intended for the transmission of a distinct mode or modes as signals or intelligence, for example, it is desirable to be able to fixedly support the end of the filament so that a light beam of a predetermined character may be properly directed and even accurately focused thereon, if desired, and also desirable to have the end or ends of the filament properly conditioned to receive or transmit the light. Accordingly, the coated filament 14 in FIG. 1 is shown with one of its ends centrally firmly embedded in an epoxy cement or the like 15 and this cement is, in turn, contained within a central bore 16 of a short relatively rigid piece of tubing 18 of any suitable material. Glass, however, has been found to be preferable.

While only one finished end of the filament is shown in FIG. 1, it should be appreciated that the opposite end of the filament could similarly be mounted and finished. Thus, it is possible to firmly support and accurately position each end portion of such a filament while the end surface 20 of the assembly is being ground and polished for properly conditioning the microscopic end of the coated filament, for the transmission of light through the core 10 thereof.

In use, the assembly containing this thin filament might be illuminated in various ways, as by a beam of parallel light directed onto its end, or by a small "spot" of light formed by a high-powered microscope objective 22, or the like, functioning in a reverse manner so as to have its short conjugate directing the light onto the very small end area of the filament. In much the same manner, a microscope objective (not shown) might be disposed with its short conjugate adjacent the opposite end of the filament and arranged to collect the energy radiating therefrom. In some cases, it might be desirable even to employ an oil-immersion objective and a drop of oil in known manner between the end 20 and objective 22 even though, in the present disclosure, no such immersion oil has been indicated.

In practice of the invention, it is quite possible at times that the light being used to illuminate the end of the core 10 might be arranged to also impinge upon the much thicker end portions of the cladding material 12 surrounding the core and, for this reason, it is preferable that the cement 15 in which the filament is embedded be a light-absorbing material. The result of this arrangement is that in a very short distance, substantially all of the light entering the end of the cladding and tending to travel longitudinally through the coating material will be absorbed thereby. Alternatively, it is possible to apply a thin coating of dull black or other light-absorbing material upon the outer surface of the coated filament adjacent the end portions thereof before same are positioned and cemented within the relatively rigid tubing 20.

It has been found that the propagation mode or modes afforded by a single very small or ultra small filament of the present invention depends upon the condition or combination of conditions being used to illuminate same, and that if all other related factors remain unchanged, different mode propagations through the single fiber may be produced by changing the illumination conditions. For example, this is evident from FIGS. 2 and 3 of the drawing, wherein two different patterns of the energy distribution at the exit end of a circular filament (which for convenience has been designated No. 35) having a diameter of approximately 5.5 microns are shown; the first having been directly illuminated by a 10 degree solid cone of monochromatic light at 0.600 micron and the second directly illuminated by a similar cone of monochromatic light at 0.511 micron.

Figure 2:
FIGS. 2 and 3 are views showing light distribution patterns for two different electromagnetic modes of energy propagation under different operative conditions through the same light-transmitting optical device.
Figure 3:
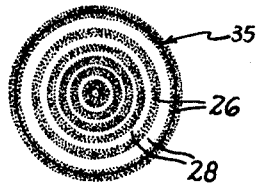

In the case of FIG. 2, it will be noted that five distinct concentric circles of light, indicated by stippled areas 26, separated from one another by dark areas, indicated by number 28, while in the case of FIG. 3, six similar distinct light circles separated by dark areas appear.

Figure 4:
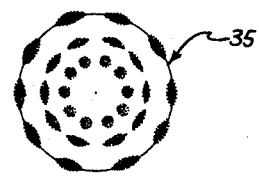
FIGS. 4, 5, 6 and 7 are views, similar to FIGS. 2 and 3, but showing four additional but noticeably different propagation modes obtained from the same device.
Figure 5:
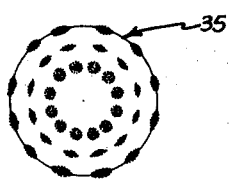

It should also be noted that when this same filament No. 35 was illuminated by polarized light at different monochromatic wave lengths (likewise directed thereon as solid cones of approximately 10 degrees) and viewed through an analyzer in crossed relation thereto, other and different propagation modes were produced. The different wave lengths of monochromatic light used to illuminate the filament for FIGS. 4, 5, 6 and 7 respectively were of 0.620, 0.568, 0.509, and 0.488 micron. With reference to the mode of FIG. 4, it will be noted that three distinct rings of dots exist in the pattern being produced and also that each of these rings is, in effect, divided into five distinct dots in each half circle portion of the pattern. However, when the illumination was changed to 0.568 micron but with all other related conditions being kept constant, the mode propagation provided by this filament changed so that its pattern, as shown in FIG. 5, was then formed by three distinct circles composed of six distinct dots in each half circle thereof.

Figure 6:
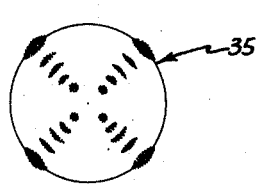
Figure 7:
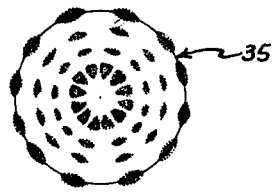

Also, when the wave length of the polarized light being used for illuminating this filament was decreased further, two additional different and readily distinguishable modes were produced; the first being shown in FIG. 6 and the other in FIG. 7. The pattern of FIG. 6, it will be noted, is composed, in effect, of five circles (partial) with only two dots in each half circle portion thereof while the pattern of FIG. 7, on the other hand, comprises four circles with six dots in each half circle portion thereof.

While the letters TE and TM (followed by subscripts $n$ and $m$) have been used as symbols for indicating the transverse electric and the transverse magnetic modes of microwave excitation and the letters EH and HE (together with subscripts $n$ and $m$) have been used for indicating hybrid modes of excitation therein, and similar terminology and symbols will be used hereinafter with reference to optical mode propagations, nevertheless, it is convenient at this time to merely design different readily distinguishable optical modes by the letter M followed by the sub-letters $n$ and $m$ for distinguishing in a general way different mode patterns; the sub-letter $n$ indicating the number of different lighted areas or dots which appear in a half circle in concentric relation to the center or longitudinal axis of the filament and the sub-letter $m$ representing the number of circles or rings of dots which can be counted from the center of the filament outwardly toward its periphery. Thus, insofar as FIGS. 2 and 3 are concerned, it will be seen that they can be separately identified by $M_{nm}$ classification system as the $M_{0,\,5}$ and the $M_{0,\,6}$ modes of propagation. Also insofar as FIGS. 4, 5, 6 and 7 are concerned, the $M_{nm}$ designations for the modes propagated thereby will be $M_{5,\,3}$, $M_{6,\,3}$, $M_{2,5}$, and $M_{6,\,4}$ respectively.

An important difference which has been found to exist between the appreciably larger optical fibers used heretofore in optical image transfer devices and the like and the very small optical filaments of the present invention is that fibers used in image transfer devices transmit optical energy without regard as to modes of propagation thereof while, on the other hand, the extremely small filament of the present invention behaves quite differently. As will be explained more fully hereinafter, it has been found that when these ultra-small optical filaments are used to transmit optical energy and the refractive index of the transparent core thereof properly related in cross-sectional size to the refractive index thereof and to the refractive index of the material surrounding or cladding this core, and with due consideration as to the wave length of the radiation to be used therewith, only a predetermined mode or modes of propagation will be transmitted thereby. Other modes will be "cut-off" and thus will not pass through.

In fact, it can be readily predetermined in accordance with the following equation which distinct and readily distinguishable or recognizable dominant and higher order modes will be propagated by such a filament. A simplified formula by which a cutoff value $U_{nm}$ for different mode propagations in a circular filament can be related to the wave length and the optical and physical properties of the filament is as follows:

$$U_{nm} \leq 2\pi \frac{a}{\lambda} \sqrt{N_1^2 - N_2^2} \tag{1}$$

and wherein $a$ is the radius or $2a$ is the diameter of the core, $N_1$ is the refractive index thereof, $N_2$ is the refractive index of the surrounding material, and $\lambda$ is the wave length in free space for the optical radiation being used.

Figure 8:
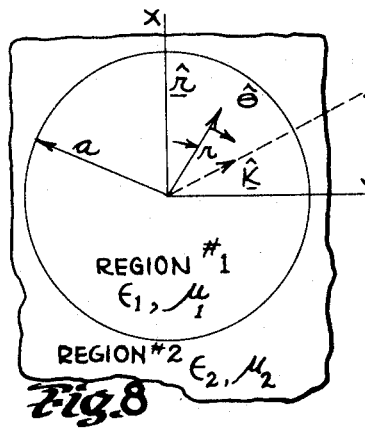
FIG. 8 is a diagrammatic sketch which is related to a transverse section through the optical device for use in describing the invention.

As previously stated, when the light-transmitting filaments are of sizes comparable to the wave length of light geometric optics does not adequately apply and, accordingly, it has been found advantageous and more satisfactory to use physical optics and consider the clad filament from the standpoint of the electromagnetic theory of energy propagation. Thus, there is diagrammatically indicated in longitudinal section in FIG. 8 at Region #1 the core of the filament of light-conducting material having a high dielectric constant $\epsilon_1$ and a high magnetic permeability $\mu_1$, and at Region #2 is indicated the cladding or surrounding material in which the filament is embedded, this cladding material having a lower dielectric constant $\epsilon_2$ and a lower permeability $\mu_2$. In FIG. 8, X and Y coordinate (in the plane of the paper) the transverse direction of the filament and a dotted line Z is intended to indicate a coordinate in the axial or longitudinal direction of the filament.

It is already accepted practice, as set forth in a textbook by J. A. Stratton entitled "Electromagnetic Theory," published in 1941 by McGraw-Hill Book Company, of New York, New York, in connection with Maxwell's well-known equations for the field vectors of an electromagnetic field to allow E, B, D, and H to indicate four different finite vectors throughout the entire field; E and H being taken as intensities respectively for the electric and magnetic fields, D being the electric displacement vector and B the vector for magnetic induction. On page 526 of this textbook, the following transcendental equation for mode propagation along a circular wave guide of infinite length and having a radius $a$ and embedded in a medium of infinite thickness is given:

$$\left[\frac{\mu_1}{u}\frac{J_n'(u)}{J_n(u)} - \frac{\mu_2}{v}\frac{H_n^{(1)'}(v)}{H_n^{(1)}(v)}\right]\left[\frac{k_1^2 J_n^1(u)}{\mu_1 u J_n(u)} - \frac{k_2^2 H_n^{(1)'}(v)}{\mu_2 v H_n^{(1)}(v)}\right] =$$
$$n^2 h^2 \left(\frac{1}{v^2} - \frac{1}{u^2}\right)^2 \tag{2}$$

whose roots are allowed values of the propagation factor $h$ and wherein $u = (\sqrt{K_1^2 - h^2})a$ and $v = (\sqrt{K_2^2 - h^2})a$ $J_n(u)$ is the Bessel function of the first kind with argument $u$, $H_n^1(v)$ is the Hankel function of the first kind with argument $v$, $K_1$ is the propagation constant for material of which the core is made, i.e. $K_1^2 = W^2 \epsilon_1 \mu$, where W is the frequency of the light, $\epsilon_1$ the dielectric constant $\mu_1$ the magnetic permeability. A similar definition may be written for $K_2^2$. The primes on $J_n(u)$ and $H_n^{(1)}(v)$ refer to differentials with respect to the arguments.

A mode is defined as a distribution of the electromagnetic field which propagates down the filament whose axis is taken as the Z direction as a simple expotential, $e^{ihz}$, where $h$ is the effective propagation constant.

The cut-off conditions for the various allowed modes are found by solving Equation 2 in the limits of $v^2 \to 0$.

$$\epsilon_1 = \frac{J_{n-1}}{\mu J_n}, \quad \epsilon_2 = \frac{H_{n-1}^{(1)}}{v H_n^{(1)}} \tag{3}$$

and $$\frac{J n^1}{u J n} = \epsilon_1 - \frac{n}{u^2}, \quad \frac{H_n^{(1)}}{v H_n^{(1)}} = \epsilon_2 - \frac{n}{v^2} \tag{4}$$

and $$h^2 = k_1^2 - \left(\frac{u}{a}\right)^2 = K_2^2 + \left[-\left(\frac{v}{a}\right)^2\right] \tag{5}$$

Then Equation 2 becomes $$\left[\epsilon_1 - \epsilon_2 - n\left(\frac{1}{n^2} - \frac{1}{v^2}\right)\right]\left[k_1^2 \epsilon_1 - K_2^2 \epsilon_2 - n\left(\frac{K_1^2}{u^2} - \frac{K_2^2}{v^2}\right)\right] =$$
$$n^2 h^2 \left(\frac{1}{u^2} - \frac{1}{v^2}\right)^2 \tag{6}$$

This equation can be reduced to read as follows:

$$(\epsilon_1 - \epsilon_2)(K_1^2 \epsilon_1 - K_2^2 \epsilon_2) - n\left(\frac{1}{u^2} - \frac{1}{v_2}\right)(K_1^2 \epsilon_1 - K_2^2 \epsilon_2) -$$
$$n\left(\frac{K_1^2}{u^2} - \frac{K_2^2}{v^2}\right)(\epsilon_1 - \epsilon_2) = 0 \tag{7}$$

Or expressed as a quadratic equation in $\epsilon_1$.

$$\epsilon_1^2 - \epsilon_1 \left[\frac{K_1^2 + K_2^2}{K_1^2} \epsilon_2 + n\left(\frac{2}{u^2} - \frac{K_1^2 + K_2^2}{K_1^2}\frac{1}{v^2}\right)\right] + \tag{8}$$
$$\left[\frac{K_2^2}{K_1^2}\epsilon_2^2 + \epsilon_2 n\left(\frac{K_1^2 + K_2^2}{K^2}\frac{1}{u^2} - \frac{2}{v^2}\frac{K_2^2}{K_1^2}\right)\right] = 0$$

$\epsilon_1$ is a function of $u$, but $\epsilon_1$ varies so much more rapidly than $u$ that where $u$ appears explicitly in Eq. 8, it can be considered a constant. With $v^2$ replaced by $-w^2$, where $w$ is real, the two roots of $\epsilon_1$ are:

$$\epsilon_1 = \frac{K_1^2 + K_2^2}{2K_1^2}\epsilon_2 + n\left(\frac{1}{u^2} + \frac{K_1^2 + K_2^2}{2K_1^2}\frac{1}{w^2}\right) \pm \sqrt{\left[\frac{K_1^2 + K_2^2}{2K_1^2}\epsilon_2 + n\left(\frac{1}{u^2}\frac{K_1^2 + K_2^2}{2K_1^2}\frac{1}{w^2}\right)\right] - \left[\frac{K_2^2}{K_1^2}\epsilon_2 + \epsilon_2 n\left(\frac{K_1^2 + K_2^2}{K_1^2}\frac{1}{u^2} + \frac{2}{w^2}\frac{K_2^2}{K_1^2}\right)\right]}$$
$$\tag{9}$$

The cut-off values for different $n$ values can be obtained by substituting for $\epsilon_2$ in the limits of $w \to 0$.

For $n \geq 2$, $$\epsilon_2 = \frac{1}{2(n-1)} \quad (10)$$

As $w \to 0$, the first term in square brackets under the square root sign in Eq. 9 predominates over the second. Let the first term in brackets be called A and the second B.

Then Eq. 9 is approximately as follows:

$$\epsilon_1 = A \pm A\sqrt{1 - \frac{B}{A^2}} \cong A \pm \left(A - \tfrac{1}{2}\frac{B}{A}\right) \quad (11)$$

or $$\epsilon_1 = 2A + (-\tfrac{1}{2})\frac{B}{A}, \tfrac{1}{2}\frac{B}{A} \quad (12)$$

As $w^2 \to 0$, the two solutions are $$\left. \begin{array}{l} \epsilon_1 \cong n\dfrac{K_1^2 + K_2^2}{K_1^2}\dfrac{1}{w^2} \to \infty \\[4pt] \epsilon_1 \cong \dfrac{1}{n-1}\dfrac{K_2^2}{K_1^2 + K_2^2} \end{array} \right\} w^2 \to 0 \quad (13)$$

$$\epsilon_1 = \frac{J_{n-1}}{uJ_n} = \infty$$

means that the cut-offs are given by the roots of $J_n(u) = 0$. Substituting for $K_1$ and $K_2$ in terms of the indices of refraction of the core, $N_1$, and of the cladding, $N_2$, the two sets of cut-off values are given by the following:

$$J_n(u) = 0 \quad (14)$$

$$\frac{J_{n-1}(u)}{uJ_n(u)} = \frac{1}{n-1}\frac{N_2^2}{N_1^2 + N_2^2} \quad (15)$$

Eq. 15 can be put in a more convenient form by substituting for $J_n$ with $u$ replaced by $(n-1)$ which gives:

$$\frac{uJ_{n-2}}{J_{n-1}} = -(n-1)\frac{N_1^2 - N_2^2}{N_2^2} \quad (16)$$

For the case $n=1$, and $$\epsilon_2 = \ln\frac{2}{\gamma w}$$

Equation 9 becomes $$\epsilon_1 = \frac{K_1^2 + K_2^2}{2K_1^2}\ln\frac{2}{\gamma w} + \left(\frac{1}{u^2} + \frac{K_1^2 + K_2^2}{2K_1^2}\frac{1}{w^2}\right) \pm$$
$$\sqrt{\left[\frac{K_1^2 + K_2^2}{2K_1^2}\ln\frac{2}{\gamma w} + \left(\frac{1}{u^2} + \frac{K_1^2 + K_2^2}{2K_1^2}\frac{1}{w^2}\right)\right]^2 - \left[\frac{K_2^2}{K_1^2}\left(\ln\frac{2}{\gamma w}\right) + \ln\frac{2}{\gamma w}\left(\frac{K_1^2 + K_2^2}{K_1^2}\frac{1}{u^2} + \frac{2}{w^2}\frac{K_2^2}{K_1^2}\right)\right]} \quad (17)$$

Since $$\frac{1}{w^2}$$

increases more rapidly than $$\ln\frac{2}{\gamma w}$$

*as* $w \to 0$ Equation 17 becomes approximately:

$$\epsilon = \frac{K_1^2 + K_2^2}{2K_1^2}\frac{1}{w^2} \pm \sqrt{\left(\frac{K_1^2 + K_2^2}{2K_1^2}\frac{1}{w^2}\right)^2 + \left(-\frac{2}{w^2}\right)\frac{K_2^2}{K_1^2}\ln\frac{2}{\gamma w}} \quad (18)$$

or $$\epsilon_1 \cong \frac{K_1^2 + K_2^2}{2K_1^2}\frac{1}{w^2} \pm \left(\frac{K_1^2 + K_2^2}{2K_1^2}\frac{1}{w^2} - \frac{2K_2^2}{K_1^2 + K_2^2}\ln\frac{2}{\gamma w}\right) \quad (19)$$

Two roots are:

$$\left. \begin{array}{l} \epsilon \cong \dfrac{K_1^2 + K_2^2}{K_1^2}\dfrac{1}{w^2} \to \infty \quad (20) \\[6pt] \epsilon_1 \cong \dfrac{2K_2^2}{K_1^2 + K_2^2}\ln\dfrac{2}{\gamma w} \to \infty \quad (21) \end{array} \right\} \text{as } w \to 0$$

Hence, both cut-offs for $n=1$ are given by $$J_1(u) = 0 \quad (22)$$

The root of Equation 22 at $u=0$ is also a possible solution. This is a consequence of the fact that the fields are proportional to $J_n$ and $J_n^1$. For $n=1$, the derivative of the Bessel function is $$J_1^1 = J_0 - \frac{J_1}{u}$$

which is non-zero for zero argument. This does not apply to the higher values of $n$, for which $J_n$ and $J_n^1$ are zero at $u=0$.

The mode with the cut-off at $u=0$ of $J_1(u)=0$, in effect, does not have a cut-off. For any value of wave length, it is possible to find $u$ and $w$ values which satisfy Equation 17. The approximation of assuming $$\frac{1}{u^2}$$

to be constant as compared with $\epsilon_1$ does not apply for the $u=0$ cut-off.

$$\epsilon_1 = \frac{J_0}{uJ_1} \cong \frac{2}{u^2} \text{ near } u=0 \quad (23)$$

which is clearly comparable to the $$\frac{1}{u^2}$$

term appearing explicitly in Eq. 17. If $$\frac{1}{u^2} \text{ and } \epsilon_1 \cong \frac{2}{u^2}$$

are solved for, then from Eq. 17 the result is the same as Eq. 21.

For the $n=0$ modes, the cut-offs can be obtained from Eq. 9 with $n=0$, which leads to $$\frac{J_1}{uJ_0} = \frac{K_1}{wK_0}, \frac{K_2^2}{K_1^2}\frac{K_1}{wK_0} \quad (24)$$

Since $$\frac{K_1}{wK_0} \cong \frac{1}{w^2 \ln\dfrac{2}{\gamma w}} \text{ as } w \to 0$$

two sets of cut-offs are given by the roots of $$J_0(u) = 0 \quad (25)$$

For modes far from cut-off, the limiting values of $u$ can be obtained from Eq. 9 by substituting for $\epsilon_2$ in the limit large $w$ and the results for the lowest order in $$\frac{1}{w}$$

are:

$$\frac{J_{n-1}}{uJ_n} = \frac{2n}{u^2} + \frac{K_1^2 + K_2^2}{2K_1^2}\frac{1}{w}, \frac{K_1^2 + K_2^2}{2K_1^2}\frac{1}{w} \quad (26)$$

But $$\frac{2n}{u^2} = \frac{J_{n-1}}{uJ_n} + \frac{J_{n+1}}{uJ_n}$$

Hence the two solutions are as follows:

$$\left. \begin{array}{l} \dfrac{J_{n+1}}{uJ_n} = -\dfrac{K_1^2 + K_2^2}{2K_1^2}\dfrac{1}{w} \quad (27) \\[6pt] \dfrac{J_{n-1}}{uJ_n} = \dfrac{K_1^2 + K_2^2}{2K_1^2}\dfrac{1}{w} \quad (28) \end{array} \right\} \text{for } w \text{ large}$$

Very far from cut-off, that is in the limit of $w \to \infty$, $u$ approaches the roots of $$J_{n+1}(u)=0 \text{ and } J_{n-1}(u)=0 \qquad (29)$$

The following six equations for components of the field of the core give the values of the fields in terms of the ratio, $P$, between the Z component of the magnetic and electric fields:

$$\left. \begin{array}{l} E_z = J_n(\lambda_1 r)(-i)F_c \\[4pt] E_r = \dfrac{h}{\lambda_1}\left[J_n^1 - P\dfrac{nJ_n}{\lambda_1 r}\right]F_c \\[4pt] E_\theta = \dfrac{h}{\lambda_1}\left[PJ_n^1 - \dfrac{nJ_n}{\lambda_1 r}\right]F_s \\[4pt] H_z = -\dfrac{h}{\mu w}PJ_n(-i)F_s \\[4pt] H_r = -\dfrac{K_1^2}{\mu w \lambda_1}\left[P\dfrac{h^2}{K^2}J_n^1 - \dfrac{nJ_n}{\lambda_1 r}\right]F_s \\[4pt] H_\theta = \dfrac{K_1^2}{\mu w \lambda_1}\left[J_n^1 - P\dfrac{h^2}{K_1^2}\dfrac{nJ_n}{\lambda_1 r}\right]F_c \end{array} \right\} \qquad (30)$$

For the case $n=0$, the two values of $P$ would be $0, \infty$. Actually, of course, the $\infty$ value is not substituted in the equations. Rather the terms without $P$ coefficients are dropped.

The solutions for $n=0$ give transverse electric (TE) or transverse magnetic (TM) modes. This is not the case for $n \geq 1$. Here, there are two values for $P$ corresponding to two linear combinations of $E_z$ and $H_z$. The two values are related to the two sets of cut-off values from the following:

$$P = \frac{n\left(\dfrac{1}{u^2} + \dfrac{1}{w^2}\right)}{\epsilon_1 - \epsilon_2 - n\left(\dfrac{1}{u^2} + \dfrac{1}{w^2}\right)} \qquad (31)$$

As cut-off is approached, $w^2 \to 0$, and $w^2\epsilon_2 \to 0$ for all $n \geq 1$. Hence $$P \cong \frac{n}{w^2 - \epsilon_{1-n}} \qquad (32)$$

For the roots where $\epsilon_1$ is finite or diverges as $$ln\frac{2}{\gamma w}$$

$w^2\epsilon_1 \to 0$, and $$P = -1 \qquad (33)$$

For the roots where $\epsilon_1$ diverges to $\infty$ as $$\frac{1}{w^2}$$

from Eq. 13 and Eq. 20, $$\lim_{w \to 0} w^2 \epsilon_1 \to n \frac{K_1^2 + K_2^2}{K_1^2}$$

and $$P = \frac{K_1^2}{K_2^2} \qquad (34)$$

Far from cut-off $w \to \infty$ and $\epsilon_2 \to 0$. Hence $$P = \frac{n}{u^2 \epsilon_1 - n} \qquad (35)$$

For the roots of $J_{n-1}(u) \to 0$, $\epsilon_1 \to 0$; and $$P = -1 \qquad (36)$$

For the roots of $J_{n+1}(u) = 0$, $$\epsilon_1 = \frac{2n}{u^2} \text{ and}$$

$$P = +1 \qquad (37)$$

A summary of the cut-off conditions and values of $P$, at cut-off and far from cut-off, for various $n$ values are given in the following Tables A and B.

For $K_1$ and $K_2$ values which differ by a small amount, $$\frac{K_1^2}{K_2^2} \cong 1 \text{ and } \frac{h^2}{K_1^2} \cong 1$$

Hence the values of $P$ are $\sim \pm 1$ for the two sets of solutions. From Eq. 30, the transverse components of the field have an $r$ dependence given by $J_{n-1}(\lambda_1 r)$ for $P = -1$ and $J_{n+1}(\lambda_1 r)$ for $P = +1$.

Two sets of solutions are indicated in the following Table A, $n$ being the order of the Bessel function, and $N_1$ and $N_2$ the indices of refraction of the core and cladding:

Table A

FIRST SET

| $n$ Value | Cut-off Conditions | Values of $P$ at Cut-Off | Mode Designation |
|---|---|---|---|
| $n=0$ | $J_0(u)=0$ | 0(TM) | $TM_{om}$ $m=1,2,\ldots$ |
| $n=1$ | $J_1(u)=0$ | $-1$ | $HE_{im}$ $m=1,2,\ldots$ |
| $n \geq 2$ | $\dfrac{J_{n-1}}{uJ_n}=\dfrac{1}{n-1}\dfrac{N_2^2}{N_1^2+N_2^2}$ Or $\dfrac{uJ_{n-2}}{J_{n-1}}=-(n-1)\dfrac{N_1^2-N_2^2}{N_2^2}$ | $-1$ | $HE_{nm}$ $m=1,2,\ldots$ |

SECOND SET

| $n$ Value | Cut-off Conditions | Values of $P$ at Cut-Off | Mode Designation |
|---|---|---|---|
| $n=0$ | $J_0(u)=0$ | $\infty$ | $TE_{om}$ $m=1,2,\ldots$ |
| $n=1$ | $J_1(u)=0$ | $\dfrac{K_1^2}{K_2^2}$ | $EH_{im}$ $m=1,2,\ldots$ |
| $n \geq 2$ | $J_n(u)=0$ | $\dfrac{K_1^2}{K_2^2}$ | $EH_{nm}$ $m=1,2,\ldots$ |

Two sets of limiting values of $u$ and $P$ far from cut-off are given in the following table:

Table B

| First Set | | | Second Set | | |
|---|---|---|---|---|---|
| $n$ Values | Limiting Value of $u$ | Value of $P$ | $n$ Values | Limiting Values $u$ | Value of $P$ |
| $n=0$ | $J_1(u)=0$ | 0(TM) | $n=0$ | $J_1(u)=0$ | $\infty$ (TE) |
| $n \geq 1$ | $J_{n+1}(u)=0$ | $-1$ | $n \geq 1$ | $J_{n+1}(u)=0$ | $+1$ |

In the following Tables C and D, two different sets of cut-off values are given:

Table C

CUT-OFF VALUES FROM $J_n(u_{nm})=0$

| $m$ | $n=0$ | $n=1$ | $n=2$ | $n=3$ | $n=4$ | $n=5$ |
|---|---|---|---|---|---|---|
| 1 | 2.405 | 3.832 | 5.135 | 6.379 | 7.586 | 8.780 |
| 2 | 5.520 | 7.016 | 8.417 | 9.760 | 11.064 | 12.339 |
| 3 | 8.654 | 10.173 | 11.620 | 13.017 | 14.373 | 15.700 |
| 4 | 11.792 | 13.323 | 14.796 | 16.224 | 17.616 | 18.982 |
| 5 | 14.931 | 16.470 | 17.960 | 19.410 | 20.827 | 22.220 |
| | $TE_{om}$ | $EH_{nm}$ | $EH_{nm}$ | $EH_{nm}$ | $EH_{nm}$ | $EH_{nm}$ |

Table D

CUT-OFF VALUES FROM $\begin{cases} J_n(u_{nm})=0 & \text{FOR } n=0,1 \\ \dfrac{uJ_{n-2}}{J_{n-1}}=-(n-1)\dfrac{N_1^2-N_2^2}{N_2^2} & \text{FOR } n\geq 2 \end{cases}$ $[N_1=1.62;\ N_2=1.52]$

| m | n=0 | n=1 | n=2 | n=3 | n=4 | n=5 |
|---|---|---|---|---|---|---|
| 1 | 2.405 | 0 | 2.460 | 3.900 | 5.210 | 6.460 |
| 2 | 5.520 | 3.832 | 5.545 | 7.055 | 8.466 | 9.815 |
| 3 | 8.654 | 7.016 | 8.670 | 10.200 | 11.655 | 13.060 |
| 4 | 11.792 | 10.173 | 11.805 | 13.345 | 14.823 | 16.260 |
| 5 | 14.931 | 13.323 | 14.940 | 16.490 | 17.980 | 19.440 |
|   | $TE_{om}$ | $HE_{nm}$ | $HE_{nm}$ | $HE_{nm}$ | $HE_{nm}$ | $HE_{nm}$ |

The pure modes that have been observed all had cut-off parameters $U_{nm}$ given by $$J_n(U_{nm})=0 \qquad (38)$$

where $U_{nm}$ refers to the $m$th zero of the $n$th order Bessel function of the first kind. The properties of the filament and the wave length are related to the cut-off parameter for the mode $M_{nm}$ by $$U_{nm} \leq 2\pi \frac{a}{\lambda}\sqrt{N_1^2-N_2^2} \qquad (39)$$

The meaning of this Eq. 39 is that the mode $M_{nm}$ will propagate only at those wavelengths for which the right-hand side of the Eq. 39 is greater than the $U_{nm}$ number computed from Eq. 38.

Figure 10:
Figure 11:
Figure 12:
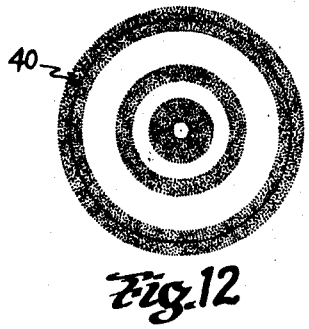

In FIGS. 10–18, an interesting study of lower order modes, broadly designated by the symbol $M_{nm}$, which have been propagated are shown for comparison purposes. In FIGS. 10, 11 and 12, for instance, modes $M_{0,1}$, $M_{0,2}$, $M_{0,3}$ are shown, in FIGS. 13, 14 and 15 modes $M_{1,1}$, $M_{1,2}$, and $M_{1,3}$ are shown and in FIGS. 16, 17 and 18, modes $M_{2,1}$, $M_{2,2}$ and $M_{2,3}$ are shown. Data relative to filaments which have been used while producing these mode patterns is given in the following table:

Table E $[N_1=1.56;\ N_2=1.52]$

Figure 13:
Figure 16:
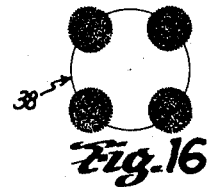
Figure 14:
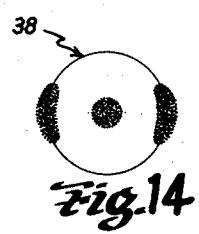
Figure 17:
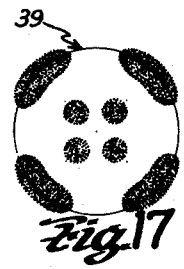
Figure 15:
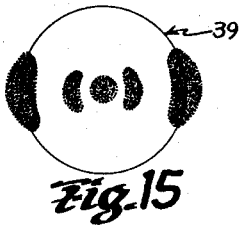
Figure 18:
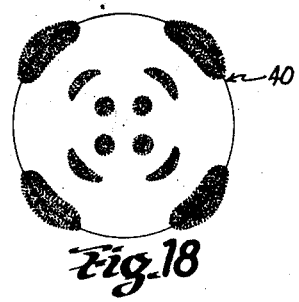

| Figure No. | Filament No. | Diameter in Microns | Wave lengths Used | Mode Propagated | Type of Illumination |
|---|---|---|---|---|---|
| Fig. 10 | 37 | ~1.9 | 0.603 | $M_{0,1}$ | I |
| Fig. 11 | 38 | ~3.1 | 0.491 | $M_{0,2}$ | I |
| Fig. 12 | 40 | ~5.5 | 0.596 | $M_{0,3}$ | II |
| Fig. 13 | 36 | ~1.2 | 0.548 | $M_{1,1}$ | I |
| Fig. 14 | 38 | ~3.1 | 0.549 | $M_{1,2}$ | III |
| Fig. 15 | 39 | ~4.2 | 0.577 | $M_{1,3}$ | I |
| Fig. 16 | 38 | ~3.1 | 0.561 | $M_{2,1}$ | II |
| Fig. 17 | 39 | ~4.2 | 0.540 | $M_{2,2}$ | II |
| Fig. 18 | 40 | 5.5 | 0.536 | $M_{2,3}$ | II |

I = 10° solid cone, direct alignment.
II = Same as I, between crossed polarizer and analyzer.
III = Image of 0.16 mm. pin hole, demagnified 100×, and angled somewhat relative to end of filament.

Figure 19:
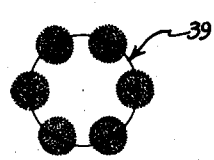
FIGS. 19–21 are views showing three different but generally similar modes of propagation produced by the new and novel optical devices.
Figure 20:
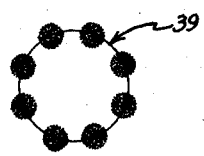
Figure 21:
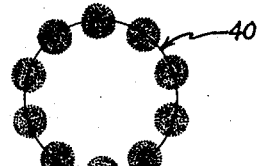
Figure 22:
FIGS. 22–27 are views showing six different modes of propagation produced by slightly modified optical devices of the present invention.
Figure 23:
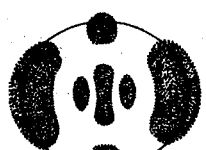
Figure 24:
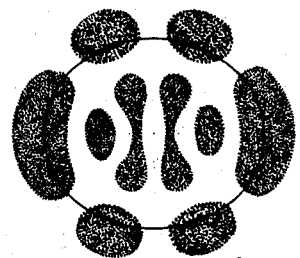
Figure 25:
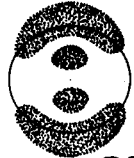
Figure 26:
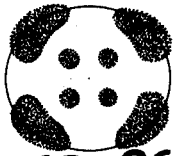
Figure 27:
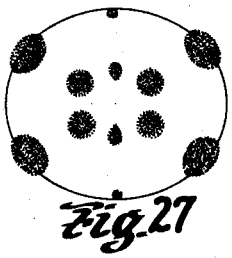

It is of interest to note the similarity which can be produced between different distinct modes, as is clearly evident from a comparison of the mode patterns in FIGS. 16, 19, 20 and 21 wherein 4, 6, 8 and 10 distinct dots in concentric relation to the axis of the filament have been produced. FIG. 16 shows the pattern produced by filament #38 using type II illumination at 0.561 wave length. FIG. 19 shows the pattern produced by filament #39 using type II illumination at 0.628 wave length. FIG. 20 shows the pattern produced by filament #39 using type II illumination at 0.495 wave length. FIG. 21 shows the pattern produced by filament #40 using type II illumination at 0.553 wave length. Also, it is interesting to note that two of these patterns, namely, of FIGS. 19 and 20 have been produced by the same filament, filament #39, by merely changing the wave lengths employed from 0.628 to 0.495, and four of these patterns were obtained with polarized light.

While the preceding patterns involve filaments of circular cross-section, FIGS. 22–27 disclose mode patterns which have been produced by elliptically shaped filaments. Even though the mode designation for FIGS. 22, 23 and 24 and for FIGS. 25, 26 and 27 may appear the same, that is $M'_{1,2}$, $M_{2,2}$ and $M_{3,2}$ respectively for each group, nevertheless, it is convenient to use a sub-letter $e$, meaning "even," before the M numbers for the modes of FIGS. 22–23 since their maximum energy distribution is in the direction of the long axis of the ellipse and to use for "odd" a sub-letter $o$ before the M numbers for the same modes in FIGS. 25–27 since a zero energy distribution direction in the pattern extends in the long axis direction of the ellipse.

Figure 28:
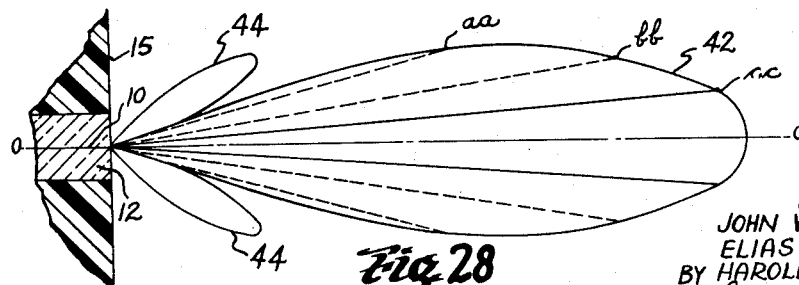
FIG. 28 is a diagrammatic representation of the energy distribution pattern produced by an optical device of the present invention.

FIG. 28 is a diagram for showing in the longitudinal direction the optical energy radiation pattern adjacent the exit end of filament number 38 and operating at a wave length of 0.549 micron with type I illumination so as to have a $M_{1,2}$ propagation mode. Such a pattern has been found useful for showing in miniature and for aiding in the study and design of large end-fire microwave antennas having relatively large energy distribution patterns which, accordingly, have been difficult to measure and evaluate readily. This radiation pattern which indicates in the main portion 42 thereof by points $aa$, $bb$ and $cc$ different amounts of energy at different angular distances outwardly from the axis $o$—$o$ of the filament, can be obtained by focusing a microscope objective on the exit end of the filament and photographing the back focal plane thereof and then using a microdensitometer on the developed image thereof. A much lesser amount of energy radiates into the side lobes 44. Or, it is possible to "view" the exit end of the fiber directly and at different angles by a photomultiplier suitably mounted on a goniometer positioned adjacent the exit end of the filament.

In combination with a lens system being used to concentrate a cone of illumination on the entrance end of the filament and wherein two different modes of propagation, for example, are desired through a single filament, it would be possible to provide energy at two or more separate wave lengths in various different ways as by positioning a divided filter having proper transmission characteristics through the two halves thereof immediately in front of and aligned with such a system and, to also use similar filter means in front of phototubes, or the like, being used to receive the propagated modes from the exit end of the filament. Other means for providing separate excitations and separate reception of different distinguishable modes, of course, also might be employed.

It is a relatively easy matter to singly excite distinguishable lower order modes in the visible region of the spectrum for filaments up to 20 microns, core diameter, and single distinguishable modes can be excited for large filaments but as the size increases, say up to 25 microns or more, the problem gets increasingly more difficult. The angularity at which the light enters a filament may also be used to help control the mode or modes to be propagated thereby, and angles as great as 45° have been used. In fact, as concerns values of the subscript $n$ for mode designation, a distinct mode $M_{n,m}$ as high as $M_{53,1}$ (actually a $EH_{53,1}$) mode has been produced by light at 0.610 micron entering a 24.5 micron core of 1.56 index glass at approximately this high angle of incidence was produced; the core being embedded in a cladding of 1.52 index glass. The light pattern in this high order mode (while not shown) appeared as a thin ring of very closely spaced dots at the periphery of the core and radiating outwardly at an angle to the axis of the filament much like the side lobes of the radiation pattern in FIG. 28.

Figure 9:
FIGS. 9–18 are views showing light distribution patterns of nine different distinct modes of optical energy propagation produced by the new and novel optical devices.
Figure 1A:
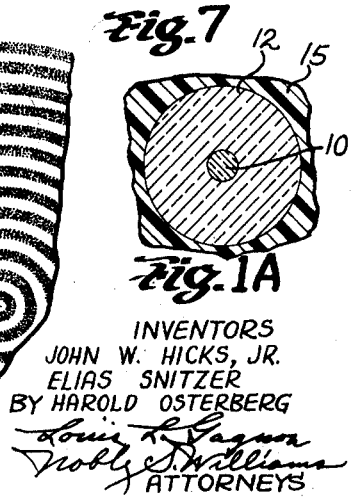
FIG. 1A is an enlarged fragmentary transverse section taken upon section 1A—1A of FIG. 1.

Also, as concerns values of the subscript $m$, it has been possible, as shown in FIG. 9, to produce a distinct mode $M_{n,m}$ as high as $M_{0,13}$ when using a 23 micron core at 0.550 micron wave length and the refractive indices as mentioned above.

While it is probable that, in most cases, filaments will be made of such sizes with reference to the radiation to be transmitted thereby that a ratio therebetween of not more than 1 to 5 will be required, nevertheless, in certain cases wherein the refractive indices of the materials chosen for the core and cladding are very close to each other, it may be desirable to greatly increase the size of the core in order to keep a proper relationship between these interrelated factors so as to produce practical devices. Thus, if the device comprises a thin elongated core formed of a material having an index of refraction $N_1$ surrounded by a cladding of a material having an index of refraction $N_2$, and for the case wherein a very small difference between the indices for core and cladding exists, an increase in value for the core radius $a$ in order to excite a given mode should be made in such a way that $a$ times the square root of $N_1^2 - N_2^2$ remains approximately constant. In order to excite a given mode, if you make the difference between $N_1$ and $N_2$ very small, then you can tolerate larger values for radius $a$ and still get the desired propagation and cut-off conditions.

Having described our invention, we claim:

1. An optical device for use in exciting and propagating a single readily distinguishable dielectric wave guide mode in optical energy in accordance with the predetermined wavelengths of light being supplied thereto, said device comprising a thin elongated filament having a generally circular central core of very small cross-sectional size and formed of a transparent material having a known refractive index, a cladding of transparent material completely surrounding said core throughout its length and in optical contact therewith, and having a relatively lower refractive index, the mean diameter of said core being of such a size as to fall within a range of sizes corresponding approximately to the shortest wavelength of light to be transmitted thereby and up to approximately five times the longest wavelength thereof, and the thickness of said cladding being at least equal to two microns, the opposite ends of said filament having optically finished end surfaces formed thereon so as to readily transmit light impinging thereon, the difference between the refractive indices of said core and said cladding being such in relation to the mean diameter of said core and the mean wavelength of the light to be transmitted thereby that said filament will propagate a readily distinguishable dielectric wave guide mode of optical energy which when designated, $M_{nm}$, and wherein the sub-letter $m$, indicative of the number of generally concentric light rings of the mode pattern, has a numerical value within a range of values from 1 to 53, and wherein the sub-letter $n$, indicative of the number of divisions of light in a half circle portion of any one of said light rings, has a numerical value within a range of values from 0 to 13.

2. An optical device for use in simultaneously exciting and propagating a plurality of different readily distinguishable dielectric wave guide modes in optical energy in accordance with a plurality of different predetermined wavelengths of the light being supplied thereto, said device comprising a thin elongated filament having a generally circular central core of very small cross-sectional size, and formed of a transparent material having a known refractive index, a cladding of transparent material completely surrounding said core throughout its entire length and in optical contact therewith, and having a relatively lower refractive index, the mean diameter of said core being of such a size as to fall within a range of sizes corresponding approximately to the shortest wavelength of radiant energy of the optical portion of the electromagnetic spectrum to be transmitted thereby and up to approximately five times the longest wavelength thereof, and the thickness of said cladding being at least equal to two microns, the opposite ends of said filament having optically finished end surfaces formed thereon so as to readily transmit light impinging thereon, the difference between the refractive indices of said core and said cladding being such in relation to the mean diameter of said core and the mean wavelengths of the light to be transmitted thereby that said filament will propagate a plurality of different readily distinguishable dielectric wave guide modes of energy each of which, when designated, $M_{nm}$, and wherein the sub-letter $m$, indicative of the number of generally concentric light rings of the mode pattern, has a numerical value within a range of values from 1 to 53, and wherein the sub-letter $n$, indicative of the number of divisions of light in a half circle portion of any one of said light rings, has a value within a range of values from 0 to 13.

3. An optical device for use in selectively propagating a single predetermined readily distinguishable dielectric wave guide mode in optical energy to be transmitted thereby, said device comprising a thin elongated filament having a generally circular central core of very small cross-sectional size and formed of a transparent material having a first refractive index, $N_1$, and a cladding of transparent material completely surrounding said core throughout its length and in optical contact therewith, and having a relatively lower refractive index, $N_2$, the mean diameter, $2a$, of said core being such as to fall within a range of sizes corresponding approximately to the shortest wavelength of optical energy of the optical portion of the electromagnetic spectrum and up to approximately five times the longest wavelength thereof, and the thickness of said cladding being at least equal to two microns, the opposite ends of said filament having optically finished end surfaces formed thereon so as to readily transmit optical energy when impinging thereon, the values of said mean diameter in relation to the refractive indices of said core and cladding and the wavelength, $\lambda$, of the optical energy to be transmitted by said filament being such as to jointly provide for the expression $$2\pi \frac{a}{\lambda} \sqrt{N_1^2 - N_2^2}$$

a numerical value which is greater than the inherent cut-off value $U_{nm}$ for said mode as established by the following formula at cutoff wavelength $$U_{nm} \leq 2\pi \frac{a}{\lambda} \sqrt{N_1^2 - N_2^2}$$

4. The method of exciting and propagating a single predetermined readily distinguishable lower order optical dielectric wave guide mode, $M_{nm}$, and wherein the sub-letter $m$ is indicative of the number of generally circular ring-like areas of the mode pattern and is equal to a whole number in a range of from 1 to 5 and the sub-letter $n$ is indicative of the number of divisions of light in each half circle portion of any one of said ring-like areas and is equal to a whole number in a range from 0 to 5, said method comprising forming an elongated filament having optically finished opposite ends and a relatively thin generally circular central core formed of a transparent material having a refractive index, $N_1$, and a cladding completely surrounding said core throughout its entire length and in optical contact therewith, and formed of a transparent material having a lesser refractive index, $N_2$, the mean diameter, $2a$, of said core being of such a controlled size as to fall within a range of sizes extending from approximately 0.3 of a micron to approximately 20 microns, and said cladding having a thickness of at least two microns, directing by suitable light-converging optical means a beam of optical energy including a preselected wavelength, $\lambda$, into one end of said core, and collecting by suitable optical means operatively positioned relative to the opposite end of said filament at least a part of the light energy being transmitted thereby, the mean diameter of said core, the refractive index of said core, and the refractive index of said cladding providing, when considered together with the mean wavelength of the optical energy being propagated therethrough a numerical value for the expression $$2\pi \frac{a}{\lambda}\sqrt{N_1^2-N_2^2}$$

which is greater than the value provided thereby at the inherent cutoff condition for the propagated mode.

5. The method of exciting and propagating a single predetermined readily distinguishable lower order optical dielectric wave guide mode, $M_{nm}$, and wherein the sub-letter $m$ is indicative of the number of generally circular ring-like areas of the mode pattern and is equal to a whole number in a range from 1 to 5, and the sub-letter $n$ is indicative of the number of divisions of light in each half circle portion of any one of said ring-like areas and is equal to a whole number in a range from 0 to 5, said method comprising forming a thin elongated filament having optically finished opposite ends and a generally circular central core formed of a transparent material of a known refractive index, $N_1$, and a cladding of transparent material completely surrounding said core in optical contact therewith, and formed of a material having a relatively lower refractive index, $N_2$, the thickness of said cladding being at least equal to two microns, the cross-sectional size of said core being so controlled during the formation thereof that its mean diameter will fall within a range of sizes including the shortest wavelength of optical energy of the electromagnetic spectrum and up to approximately five times the longest wavelength thereof, directing by suitable light-converging optical means a beam of optical energy of a preselected wavelength into an end of said core, and collecting by suitable means operatively positioned relative to the opposite end thereof at least a part of the light energy emitted therefrom, the mean diameter of said core, $2a$, the refractive index of said core and the refractive index of said cladding providing, when considered together with the mean wavelength, $\lambda$, of the optical energy being propagated therethrough, a numerical value for the expression $$2\pi \frac{a}{\lambda}\sqrt{N_1^2-N_2^2}$$

which is greater than the value provided thereby at the inherent cutoff condition for the propagated mode.

6. The method of exciting and propagating a plurality of different predetermined readily distinguishable lower order optical dielectric wave guide modes, each of which may be designated $M_{nm}$, but with the sub-letter $m$ in each case being indicative of the number of generally circular ring-like areas of the mode pattern and equal to a whole number in a range of from 1 to 5 and with the sub-letter $n$ in each case being indicative of the number of divisions of light in each half circle portion of any one of said ring-like areas, and equal to a whole number in a range from 0 to 5, said method comprising forming an elongated filament having optically finished ends and a relatively thin generally circular central core formed of a transparent material of a refractive index, $N_1$, and a cladding completely surrounding said core throughout its length and in optical contact therewith, and formed of a transparent material having a lesser refractive index, $N_2$, the mean diameter, $2a$, of said core being of such a controlled size as to fall within a range of sizes extending from approximately 0.3 of a micron to approximately 20 microns, and said cladding having a thickness of at least two microns, directing by suitable light-converging means a plurality of mutually independent beams of optical energy of different preselected wavelengths into an end of said core, collecting by suitable optical means operatively positioned relative to the opposite end of said filament at least a part of the light energy of each of said different mode patterns being emitted therefrom, the mean diameter of said core, the refractive index of said core and the refractive index of said cladding providing, when considered together with the mean wavelengths, $\lambda$, of the optical energy being propagated therethrough, numerical values for the expression $$2\pi \frac{a}{\lambda}\sqrt{N_1^2-N_2^2}$$

which are each greater than the value provided thereby at the inherent cutoff condition for each of the propagated modes.

References Cited by the Examiner

UNITED STATES PATENTS 2,825,260  3/58  O'Brien.

OTHER REFERENCES

Hopkins et al.: "Transparent Fibers for the Transmission of Optical Images," Optica Acta, vol. 1, No. 4, 1955, pages 164–170.

Snitzer et al.: "Optical Wave-Guide Modes in Small Glass Fibers 'I,' 'II,' " and "Optical Coupling Between Two Parallel Dielectric Wave Guides," Journal of the Optical Society of America, vol. 49, No. 11, November 1959, page 1128.

JEWELL H. PEDERSEN, *Primary Examiner.*

EMIL G. ANDERSON, WILLIAM MISIEK, *Examiners.*